C. O. PAPE.
DUMPING VEHICLE.
APPLICATION FILED DEC. 18, 1909.
980,556.
Patented Jan. 3, 1911.
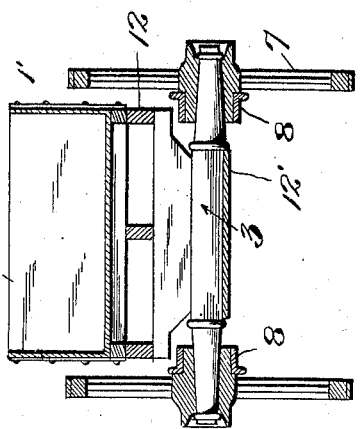
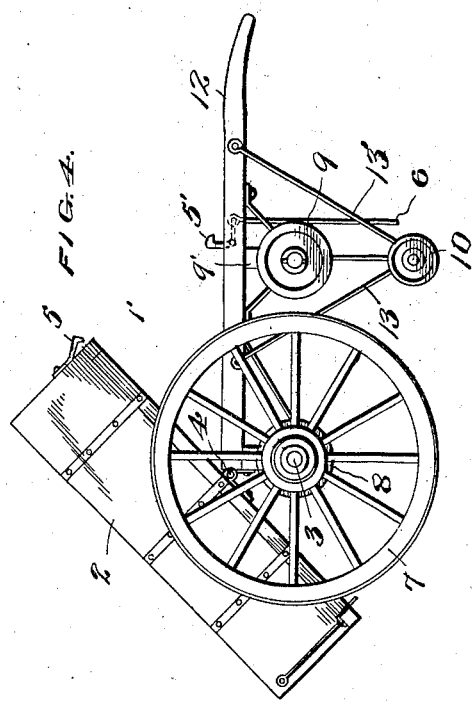
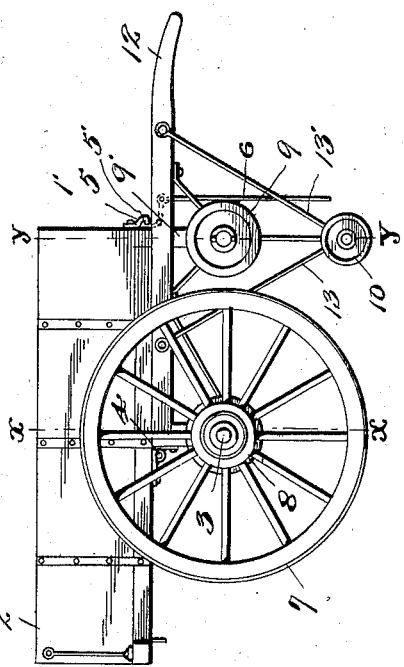
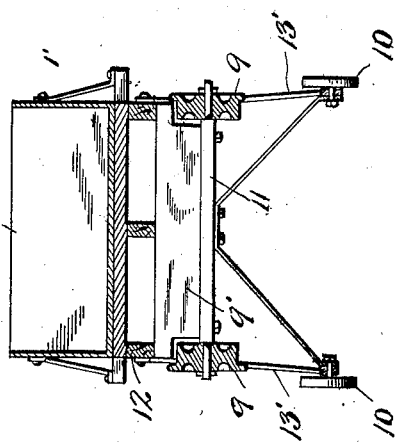
WITNESSES
INVENTOR
Charles O. Pape
Attorney

UNITED STATES PATENT OFFICE.

CHARLES O. PAPE, OF WAUPETON, IOWA.

DUMPING-VEHICLE.

980,556.   Specification of Letters Patent.   Patented Jan. 3, 1911.

Application filed December 18, 1909. Serial No. 533,810.

*To all whom it may concern:*

Be it known that I, CHARLES O. PAPE, a citizen of the United States, residing at Waupeton, in the county of Dubuque and State of Iowa, have invented certain new and useful Improvements in Dumping-Vehicles, of which the following is a specification.

My invention relates to dumping vehicles and while the same is more particularly adapted for transferring rock, etc., from quarries and dumping it into barges for transportation, the same may be put to other uses.

A further object is to provide an apparatus as described which shall be of simple and inexpensive construction and efficient in operation.

The invention consists in the novel construction, arrangement and combination of parts as hereinafter fully described, illustrated in the drawing and pointed out in the appended claims.

In the drawings:—Figure 1 is a side elevation of one of the cars used in my apparatus. Fig. 2 is a vertical sectional view on the line X—X of Fig. 1. Fig. 3 is a similar view on the line Y—Y of Fig. 1. Fig. 4 is a side elevation of the car with its body in tripped or dumping position.

1 indicates my improved dumping car or vehicle, comprising a box or body 2, hinged as at 4 to an axle 3. Ground wheels 7 are mounted on the ends of the axle and to the inner ends of the hubs of said wheels are secured flanged wheels 8. Supported in suitable hangers 9' secured to the shafts 12 is an axle 11 which carries at opposite ends flanged wheels in alinement with the wheels 8.

12 indicates the shafts, the inner ends of which are secured to the supports 12' carrying axle 3, and to said shafts are secured the upper ends of braces 13, 13' the lower ends of which support wheels 10, the latter affording support for the shafts.

5 indicates a suitable latch plate or arm carried by the front end of the box 2 and adapted to detachably engage with a hook-shaped latch or arm 5' secured to the shafts to hold the box in position for loading. The arm 5' is adapted to be operated by a treadle 6 to release the latch plate 5.

The wheels 8 and 9 are adapted to run upon suitable tracks extending between the point where the car is to be loaded and the point where the car is to dump its contents, as a barge for instance, and the wheels 7 and 10 are adapted to run upon the deck of the barge to be loaded, after the wheels 8 and 9 have left the tracks.

By releasing the catch 5 the box 2 of the car may be allowed to tilt to discharge its load.

What I claim is:—

1. In an apparatus of the character described a car comprising a tiltable body, an axle to which the body is hinged, ground-wheels 7 mounted on said axle, flanged wheels 8 mounted on the inner ends of the hubs of wheels 7, shafts carrying at one end the said axle, hangers on said shafts, an axle 11 supported by said hangers, flanged wheels 9 carried by said axle 11 in alinement with the wheels 8, downwardly-extending braces secured to the shafts, and wheels 10 carried by said braces.

2. In an apparatus of the character described a car comprising a tiltable body, an axle to which the body is hinged, ground-wheels 7 mounted on said axle, flanged wheels 8 mounted on the inner ends of the hubs of wheels 7, shafts carrying at one end the said axle, hangers on said shafts, an axle 11 supported by said hangers, flanged wheels 9 carried by said axle 11 in alinement with the wheels 8, downwardly-extending braces secured to the shafts, and wheels 10 carried by said braces, a latch carried by the shafts, an arm on the body adapted to be engaged by the said latch, and a downwardly-extending treadle carried by the latch adapted to be operated to cause the latch to release the body.

In testimony whereof I affix my signature in presence of two witnesses.

CHARLES O. PAPE.

Witnesses:
W. H. PAPE,
ODELL REED.